(12) United States Patent
Ecton et al.

(10) Patent No.: US 12,449,600 B2
(45) Date of Patent: Oct. 21, 2025

(54) POSITION CONTROLLED WAVEGUIDES AND METHODS OF MANUFACTURING THE SAME

(71) Applicant: Intel Corporation, Santa Clara, CA (US)

(72) Inventors: Jeremy Ecton, Gilbert, AZ (US);
Leonel Arana, Phoenix, AZ (US);
Whitney Bryks, Tempe, AZ (US);
Haobo Chen, Chandler, AZ (US);
Benjamin Duong, Phoenix, AZ (US);
Changhua Liu, Chandler, AZ (US);
Brandon Marin, Gilbert, AZ (US);
Srinivas Pietambaram, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 17/483,565

(22) Filed: Sep. 23, 2021

(65) Prior Publication Data

US 2023/0104330 A1    Apr. 6, 2023

(51) Int. Cl.
*G02B 6/136*    (2006.01)
*G02B 6/12*    (2006.01)
*G02B 6/122*    (2006.01)
*G02B 6/132*    (2006.01)

(52) U.S. Cl.
CPC .......... *G02B 6/136* (2013.01); *G02B 6/1223* (2013.01); *G02B 6/132* (2013.01); *G02B 2006/12038* (2013.01); *G02B 2006/12111* (2013.01)

(58) Field of Classification Search
CPC ...... G02B 6/136; G02B 6/1223; G02B 6/132; G02B 2006/12038; G02B 2006/12111; G02B 6/4228; G02B 6/4206; G02B 6/122
See application file for complete search history.

(56) References Cited

U.S. PATENT DOCUMENTS 10,527,786 B2 *   1/2020   Leonberger ........ G02B 6/12028
2022/0196914 A1   6/2022   Ecton et al.

* cited by examiner

*Primary Examiner* — John Bedtelyon
(74) *Attorney, Agent, or Firm* — Hanley, Flight & Zimmerman, LLC

(57) ABSTRACT

Position controlled waveguides and methods of manufacturing the same are disclosed. An example apparatus includes a substrate with a channel that extends into a first surface of the substrate to a second surface of the substrate, wherein the second surface is recessed relative to the first surface; buffer material having a first index of refraction on the second surface of the substrate; and a waveguide on the buffer material, the waveguide having a second index of refraction that is higher than the first index of refraction.

25 Claims, 11 Drawing Sheets

POSITION CONTROLLED WAVEGUIDES AND METHODS OF MANUFACTURING THE SAME

FIELD OF THE DISCLOSURE

This disclosure relates generally to optical interconnects and, more particularly, to position controlled waveguides and methods of manufacturing the same.

BACKGROUND

Interconnects facilitate the transfer of data signals between two or more circuit components. Interconnects are vital for the function of any circuit and affect the performance of a digital system. As demand for high data rate signaling increases, many electrical interconnects cannot keep up with the energy efficiency requirements for sustained bandwidths. Accordingly, optical interconnects are being explored as a viable alternative.

Figure 1:
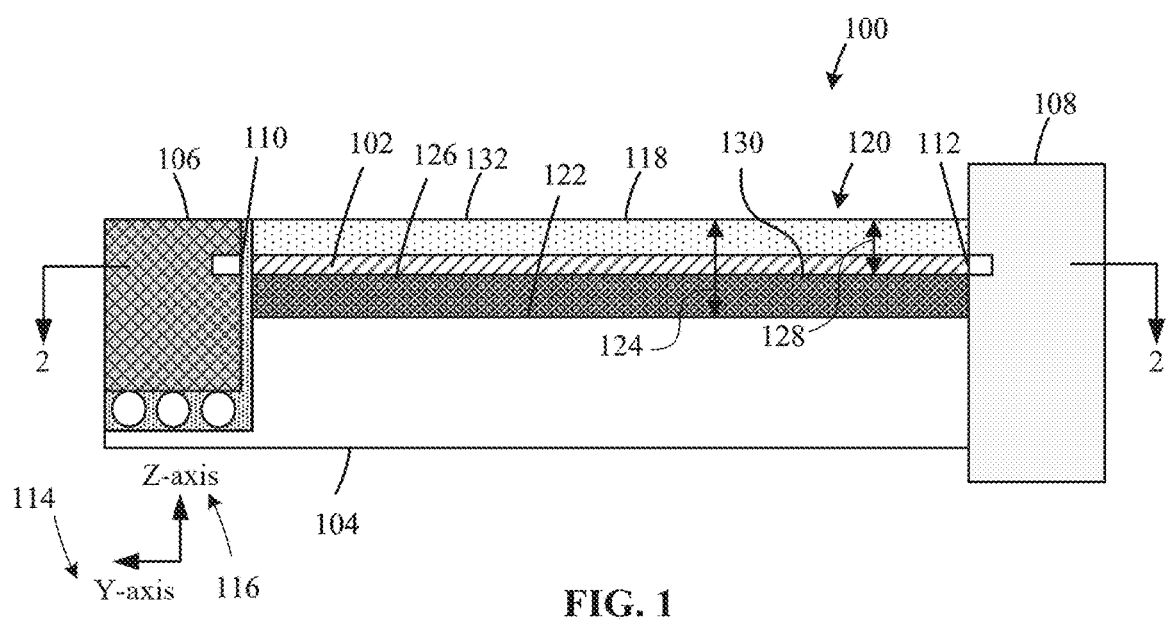
FIG. 1 is cross-sectional view of an example waveguide structure constructed in accordance with teachings disclosed herein.

The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. Additionally, several examples have been described throughout this specification. Any features from any example can be included with, a replacement for, or otherwise combined with other features from other examples. As used herein, "approximately" and "about" refer to dimensions that may not be exact due to manufacturing tolerances and/or other real world imperfections. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

DETAILED DESCRIPTION

As noted above, demand for high data rate signaling is ever-increasing and with it, the demand for sustainable bandwidth. Reasons for increased demand for data signaling rates and bandwidth are innumerable, including a constant demand for faster internet connections, increased reliance on electronic devices (e.g., computing devices, smartphones, Internet of Things (IoT) devices, etc.), an ever-increasing number of such electronic devices, and an increase of cloud-based services that must transfer larger amounts of data to support applications used by such electronic devices. That is, the world is demanding more data transfer with less lag.

As used herein, an interconnect is a passive component that communicatively connects two or more other components of an electronic device to enable the transfer of data signals between the two or more components. That is, interconnects provide a communication path for the data transfer between components. In some instances, interconnects may be incorporated into an integrated circuit (IC) that also contains the different components to be connected. In other instances, the interconnects may be employed within an IC package to connect components in separate semiconductor dies contained in the package. In still other instances, interconnects may extend between separate IC packages and/or other components. The nature of such interconnects is a determining factor of the performance of any electronic device that includes the components communicatively coupled by such interconnects. Inefficient and/or inadequate interconnects necessarily lead to inefficient and/or inadequate data transfer signal rates and/or low bandwidth.

Many electronic devices today utilize electrical interconnects to enable communications between different components of the devices. Electrical interconnects transfer data signals along a metal wire via electric current. The data signal transfer is facilitated via an electron flux that flows through a metal (e.g., electrical) wire. All metal wires retain resistance and capacitance, which limit the ability of signal transfer, especially when the dimension of the wires is scaled down. Accordingly, electrical interconnects cannot keep up with the ever-increasing demand for high data rate signaling and bandwidth. Further, electrical interconnects cannot keep up with the energy efficiency requirements for such sustained bandwidth.

Another option for interconnections between components of an electronic device is optical interconnects. Optical interconnects demonstrate unparalleled long distance signaling capabilities at high rates of data transfer. As such, optical interconnects are a likely solution for meeting the upcoming demands for high data rate signaling and are actively being explored as a viable alternative to electrical interconnects.

Just as electrical interconnects transfer data signals via electrical current that flows through a metal wire, optical interconnects transfer data signals via photons that flow along a waveguide. A waveguide as disclosed herein is a physical structure that guides light (i.e., photons) along a path to facilitate the transfer of data from one component to another component. A waveguide guides light by restricting the spatial region along which the light can propagate. More particularly, a waveguide is manufactured by producing a length of first material (corresponding to the waveguide that defines the path of travel for the light) that is surrounded by a second material. The light is contained within the first material (e.g., the waveguide) due to a difference in the index of refraction of the two materials. Specifically, the first material has a relatively high refractive index compared to the second material in the surrounding region.

An area of focus being actively explored in the field of optical interconnects involves routing optical signals from a photonic integrated circuit (PIC) through a substrate containing an array of waveguides to a fiber array unit (FAU) via a waveguide. A PIC is a chip that contains photonic components that output data in the form of light signals. An FAU is an assembly of optical fibers that can receive the light signals emitted from outputs of the PIC to transmit and deliver the signals to other components. For reliable conveyance of data between a PIC and an FAU, the outputs (e.g., optical signals emitters) of the PIC and the inputs (e.g., optical signal receivers) of the FAU must properly align in all directions with optical interconnects (e.g., waveguides) extending therebetween. For example, an output of a PIC must align with the waveguide in the x-position, the y-position, and the z-position for the optical signal to properly transfer from the PIC to the waveguide. Further, the waveguide must align with the input of the FAU in the x-position, y-position, and the z-position for the signal to properly transfer from the waveguide to the FAU. Such alignment is a challenge that only gets more difficult to overcome as circuit sizes decrease. The small size of integrated circuits today require interconnects to be fabricated directly onto a substrate. Accordingly, a waveguide must be fabricated onto a substrate such that the x-, y-, and z-position alignment of the waveguide relative to the input and output of corresponding optical components allows adequate transfer of an optical signal therebetween. As used herein, x- and y-positions (and, correspondingly, x- and y-directions) refer to positions (and directions) along respective X and Y axes defined in a plane corresponding to a primary surface of a substrate along which waveguides are formed. As used herein, z-positions (and z-directions) refer to positions (and directions) along a Z axis that is normal to the plane of the primary surface of the substrate. That is, z-positions corresponds to the depth and/or height of a waveguide relative to the primary surface of the substrate.

The x-position and y-position of a waveguide can be controlled relatively accurately using known lithography methods. However, standard lithography techniques do not provide adequate control of the z-position of a waveguide for reliable alignment with an input and/or output of an optical component (e.g., a PIC, an FAU, etc.). Misalignment of waveguides in the z-direction can significantly undermine the quality of data transfer through such waveguides, thereby offsetting the benefits of optical interconnects. Laser direct writing in glass is another possible approach to produce waveguides on a substrate between a PIC and an FAU that provides relatively accurate control in the x-, y-, and z-directions. However, laser direct writing is a costly process and exhibits a slow run rate.

Example methods disclosed herein enable the manufacturing of example waveguide structures that include waveguides that are accurately aligned in the x-, y-, and z-positions relative to PIC photonic outputs. Examples disclosed herein fabricate a waveguide directly into a trench of a substrate. In some examples, the trench may be formed using standard lithography techniques. However, other suitable techniques may be used, such as dry etching techniques. As described above, currently available techniques do not provide high accuracy in the depth direction. Accordingly, in examples disclosed herein, the precise z-position for the waveguide is made possible by etching the trench deeper than the intended location of the bottom surface of the waveguide and then depositing a layer of buffer material onto the bottom surface of the trench before the waveguide is added. That is, while the etching associated with lithography cannot precisely control the depth of the etch (e.g., the z-position of the bottom of the trench), the deposition of the buffer material on the bottom of the trench can be precisely controlled up to any desired z-position. In some examples, an etch stop may be used to help control the position of the initial depth of the etch. For example, a film made of material that is non-reactive with the substrate etchant may be placed between two pieces of the substrate (e.g., two pieces of glass), all of which is positioned between two optical components. Etching occurs at a top surface of the substrate towards the film and continues until the film is reached. The result is a channel with a depth corresponding to the film placement. However, optical component input and/or output locations may vary from unit-to-unit. Accordingly, an etch stop technique alone will not provide proper z-position control for the waveguide. In such examples, buffer material may still be needed for proper z-position control.

In some examples, the precise thickness of the buffer material (to arrive at the desired z-position) is achieved by implementing a feedback loop during the deposition process. In particular, in some examples, the z-position of the buffer material is measured relative to the position of the PIC outputs and/or FAU inputs and fed back as an input into the deposition process to adjust the amount of any additional buffer material to be added. Based on this feedback loop approach, unit-to-unit variation can be accounted for using a shuttering system to control buffer layer thickness individually per unit.

Once the buffer material has been added in the trench up to the desired depth (e.g., z-position), the waveguide material is added onto the buffer material. As a result, the waveguide will be precisely aligned with the PIC outputs in the depth direction. After the waveguide has been added, an additional filler material can be added to surround the waveguide and fill excess space within the trench. In some examples, the filler material has an index of refraction that matches the buffer material and is lower than the index of refraction of the waveguide material. The example methods of manufacture disclosed herein provide potentially higher run rates at a lower cost than other approaches such as laser direct writing in glass and offer greater alignment in the z-position than lithography approaches used in the past.

The deposition of a buffer material within a deep trench underneath a waveguide also enables the fabrication of a graded index of refraction at the interface between the waveguide and the surrounding material. More particularly, in some examples, such graded interfaces are achieved by depositing multiple layers of material with indexes of refraction that incrementally differ according to the desired index of refraction grading. The index of refraction grading at the interface of the buffer material and the waveguide can be similarly produced at the interface between the waveguide and the filler material added after the core of the waveguide has been formed on the buffer material. Additionally or alternatively, the graded index of refraction may be achieved by including a diffused waveguide. A diffused waveguide as disclosed herein is a waveguide formed through diffusion of dopants into the waveguide that affect the index of refraction of the waveguide. In such examples, the density of the dopant within the waveguide will vary based on a distance of diffusion into the waveguide, thereby producing an index of refraction grading. For example, a lithium niobate waveguide with a core formed by titanium diffusion may be used. Although examples disclosed are described with respect to a waveguide in a substrate between a PIC and an FAU, the example waveguide structures disclosed herein can be implemented to interconnect any type of optical components.

Figure 2:
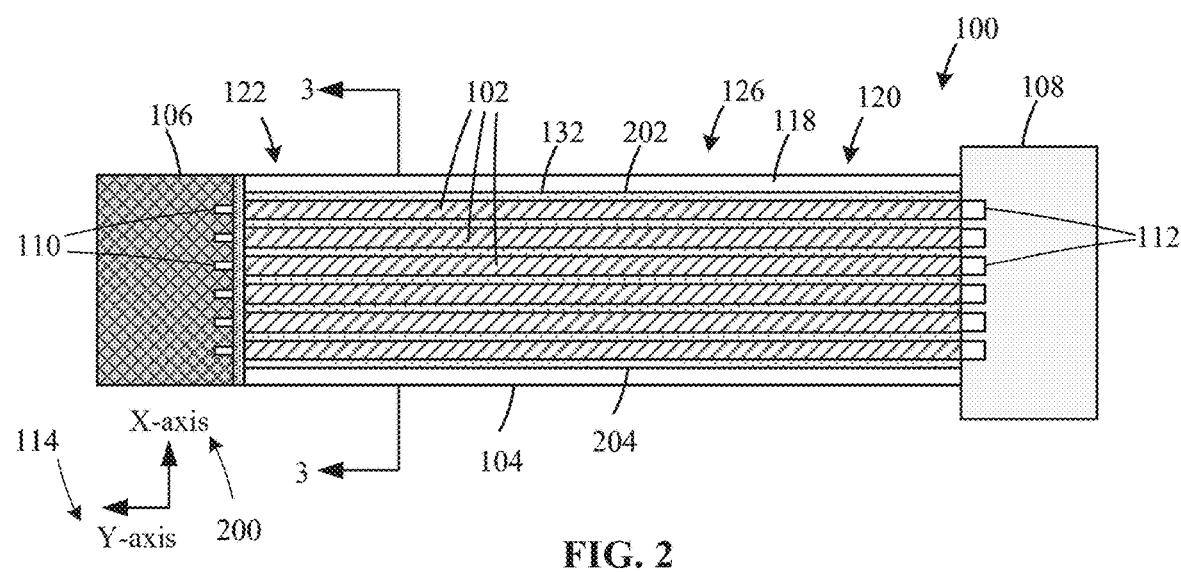
FIG. 2 is a top-down view of the example waveguide structure of FIG. 1 taken along the line 2-2 of FIG. 1.
Figure 3:
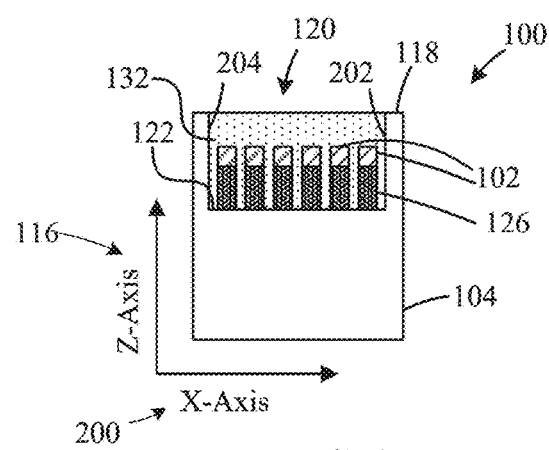
FIG. 3 is a cross-sectional view of the example waveguide structure of FIGS. 1 and 2 taken along the line 3-3 of FIG. 2.

FIGS. 1-3 are different views of an example waveguide structure 100 constructed in accordance with teachings disclosed herein. In particular, FIG. 1 is a cross-sectional view of the example waveguide structure 100 taken along a length of a particular waveguide 102 in the waveguide structure 100. FIG. 2 is a top-down view of the example waveguide structure 100 taken along the line 2-2 of FIG. 1. FIG. 3 is a cross-sectional view of the example waveguide structure 100 taken along the line 3-3 of FIG. 2. In this example, the waveguide structure 100 is fabricated directly onto a substrate 104. In this example, the substrate 104 is a glass substrate. However, the substrate 104 can be made of another material including silicon, silicon dioxide, gold, etc.

The waveguide structure 100 of the illustrated example is situated between a first optical component 106 and a second optical component 108. In this example, the first optical component 106 is a photonic integrated circuit (PIC) that includes an array of outputs 110 corresponding to optical signal emitters, and the second optical component 108 is a fiber array unit (FAU) that includes an array of inputs 112 corresponding to optical signal receivers. However, the example waveguide structure 100 can be positioned to provide optical interconnects between any two optical components, including optical amplifiers, lasers, detectors, etc. The example waveguide structure 100 is positioned to facilitate the transfer of optical signals between the PIC 106 and the FAU 108. More particularly, in the illustrated example, the waveguide structure 100 includes an array of waveguides 102 that are precisely aligned with corresponding outputs 110 of the PIC 106 and precisely aligned with corresponding inputs 112 of the FAU 108. As detailed further below, the waveguides 102 are precisely aligned in each of X, Y, and Z axes. For purposes of explanation, as shown in the figures, the X axis 200 extends parallel to the array of outputs 110 of the PIC 106, the Y axis 114 extends parallel the elongate lengths of the waveguides 102 in a direction extending between the first optical component 106 and the second optical component 108, and the Z axis 116 extends in a depth direction into the substrate 104 that is normal the plane defined by the primary or top surface (e.g., upper surface, first surface) 118 of the substrate 104. In the illustrated example of FIGS. 1-3, the array of waveguides 102 includes six separate waveguides that align with the six corresponding outputs 110 of the PIC 106 and six corresponding inputs 112 of the FAU 108. In other examples, the array of outputs 110 and inputs 112 (and the corresponding number of waveguides 102) may include be more or fewer than the six shown. In some examples, the waveguide structure 100 includes only a single waveguide 102 to provide an optical interconnect between a single output 110 and a single input 112.

In the example waveguide structure 100 in FIGS. 1-3, a deep channel (e.g., trench, recess, cavity, etc.) 120 is etched into the top surface 118 of the substrate 104 and extends to a channel bottom corresponding to a recessed surface 122 of the substrate 104. The deep channel 120 is referred to herein as a "deep" channel because it extends to a depth 124 (e.g., in a direction of the Z axis 116) beyond the depth of the bottom edge of the optical outputs 110. The channel depth 124 allows for a buffer layer 126 to be placed onto the substrate 104 (including, more particularly, the recessed surface 122 of the substrate 104) prior to deposition of the waveguides 102. In this example, the channel 120 has a width (along the X axis 200) that extends from a first sidewall 202 to a second sidewall 204. As shown in the illustrated example, the width of the channel 120 is wider than the width of the array of waveguides 102 such that all of the waveguides are positioned within the same channel 120.

The example buffer layer 126 includes a buffer material that is deposited within the channel 120 prior to deposition of the waveguide material to control the z-position of the waveguides 102. Control of the z-position of the waveguide 102 relative to the optical output 110 is required to facilitate reliable transfer of optical signals from the optical output 110 to the waveguide 102, and along the waveguide 102 to a corresponding optical input 112. The process of depositing the buffer material into the channel 120 can be accomplished with much greater depth control (e.g., on the order a nanometers) than is possible for the etching of the channel 120 (with depth control on the order of microns). Thus, the initial etching of the channel 120 is a coarse technique to get down to a depth 124 below the desired z-position 128 for the waveguides 102 that is followed by the deposition the buffer layer 126 as a precise technique to fill the channel 120 up to the desired z-position 128.

The example buffer layer 126 is defined by layer(s) of buffer material that have a relatively low index of refraction compared to the index of refraction of the waveguide 102. For example, the material used for the buffer layer 126 may include silicon dioxide, silicon nitride, silicon oxynitride, etc. The materials used for the example waveguide 102 may include germanium, germanium arsenide, indium phosphide, barium titanate, tantalum pentoxide, titanium dioxide, silicon nitride, silicon carbide, etc. In some examples, a feedback loop is applied when depositing the buffer layer 126 to adjust the amount of buffer material that is deposited so as to precisely control the depth or z-position of the upper surface 130 of the buffer layer 126. That is, while the buffer layer 126 is being deposited, a depth of the channel 120 is measured at the upper surface 130 of the buffer layer of material, which is then compared to the depth or z-position 128 of the optical outputs 110. The deposition of the buffer layers(s) of the buffer material is modified based on the measured depth relative to the z-position 128 of a bottom edge of the optical outputs 110. More particularly, if the depth of the upper surface 130 of the buffer layer 126 is below the z-position 128 of the bottom edge of the optical outputs 110, deposition of the buffer layer 126 continues. The process is repeated until the buffer layer 126 reaches, but does not surpass, the z-position 128 of bottom edge of the optical outputs 110.

As mentioned above, the example waveguides 102 are deposited onto the example buffer layer 126. As shown in FIG. 3, the buffer layer 126 is divided into separate portions corresponding to separate ones of the waveguides 102. However, in other examples, the buffer layer 126 may extend continuously underneath adjacent ones of the waveguides 102. Inasmuch as the deposition of the buffer layer 126 was controlled to position the upper surface 130 of the buffer layer 126 at a particular z-position 128 that is aligned with the bottom edge of the optical outputs 110, the z-position of the waveguides 102 will be precisely aligned with the optical outputs 110. The example waveguides 102 are made out of a material having a relatively high index of refraction relative to the index of refraction of the buffer layer 126 material. The example waveguides 102 define paths to guide optical signals from the optical signal outputs 110 and to the optical signal inputs 112.

The example waveguide structure 100 further includes a filler material 132 disposed within the channel (i.e., trench, recess, cavity, etc.) 120 to surround and/or enclose the waveguides 102 and the corresponding exposed portions of the buffer layer 126. In some examples, the filler material 132 is made out of a material (e.g., a gel or spin on glass) having an index of refraction that matches the index of refraction of the material of the buffer layer 126.

The relative dimensions of the channel 120, the buffer layer 126, waveguides 102, and the filler material 132 shown in FIGS. 1-3 are for purposes of illustration and other relative dimensions are possible. For instance, although the thickness (in the z-direction) of the buffer layer 126 is shown as being greater than the thickness (in the z-direction) of the waveguide 102, in other examples, the thickness of the buffer layer 126 is equal to or less than the thickness of the waveguides 102. Further, although the depth 124 of the channel 120 is shown as being considerably (e.g., more than 2 times, 3 times, 5 time, etc.) larger than the thickness of the waveguides 102, in other examples, the channel 120 can be smaller (e.g., less than 2 times the thickness of the waveguides 102). More particularly, in some examples, the channel 120 can have a depth 124 (in the z-direction) ranging approximately between 10 µm to 100 µm with the waveguides 102 having a height (e.g., thickness in the z-direction) of approximately 9 µm. In some examples, the cross-section of the waveguides 102 is square such that the width is equal to the height (e.g., 9 µm in the above example).

In the illustrated example, the buffer layer 126 is divided into portions, each portion corresponding to one of the waveguides 102, and having a same width dimensions as the waveguides 102. However, the width of the buffer layer 126 is less important than the depth of the buffer layer 126 since the depth of the buffer layer 126 is what provides control for the z-position 128 of the waveguides 102 relative to the optical signal output 110. The particular depth of the buffer layer 126 depends on the depth 124 of the channel 120 and, more particularly, how far the depth 124 extends below the bottom edge of the optical outputs 110. In some examples, the depth 124 of the channel 120 extends below the optical outputs 110 by no more than approximately the thickness or height of the waveguides 102. Accordingly, in the example of a 9 µm by 9 µm waveguide 102, the depth of the buffer layer 126 may be less than or equal to approximately 9 µm. A reason for the buffer layer 126 depth being approximately less than or equal to the depth of the waveguides 102 is that the depth control for creation of the deep channel 120 is approximately ±10% the depth of deposition of the waveguide material. The distance or spacing between the individuals waveguides 102 and the waveguides to the sidewalls 202, 204 can be any suitable distance and is driven by the spacing or pitch of the optical outputs 110 of the PIC 106.

In some examples, as with the buffer layer 126, the filler material 132 has a height or thickness (measured from the top surface of the waveguides 102) that is dependent on the overall depth 124 of the channel 120. In some examples, the filler material 132 entirely fills up the channel 120 such that the thickness of the filler material 132 corresponds to the depth 124 of the channel 120 less the thicknesses of the of both the buffer layer 126 and the waveguides 102. In other examples, the filler material 132 may not entirely fill the channel 120 such that the upper surface of the filler material 132 is below the top surface 118 of the substrate 104. In some examples, the thickness of the filler material 132 above the waveguides 102 is approximately equal to the thickness of the buffer layer 126 beneath the waveguides 102. In other examples, the thickness of the filler material 132 may be larger or smaller than the thickness of the buffer layer 126 beneath the waveguides 102.

Figure 4:
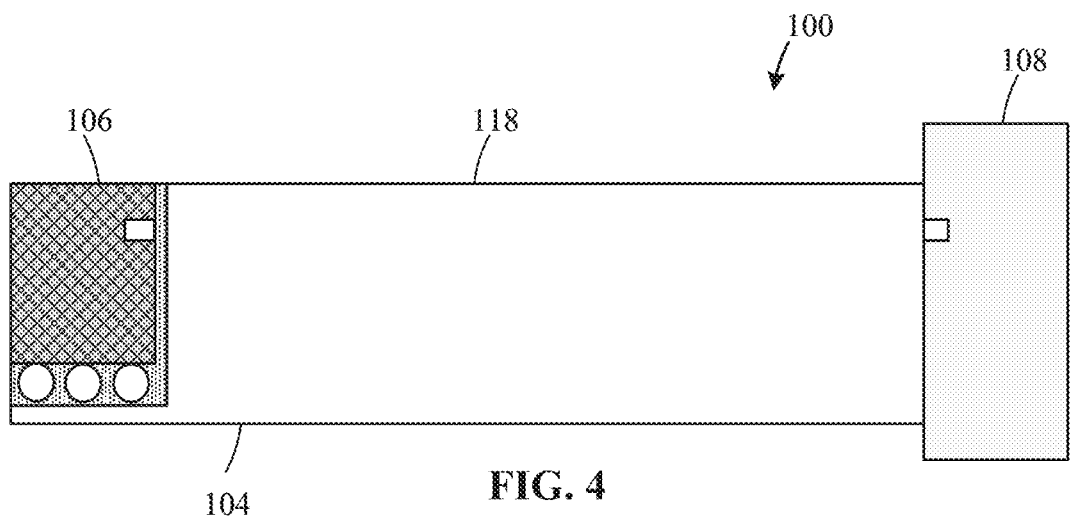
FIGS. 4-9 illustrate various stages of manufacture of the example waveguide structure of FIGS. 1-3.
Figure 5:
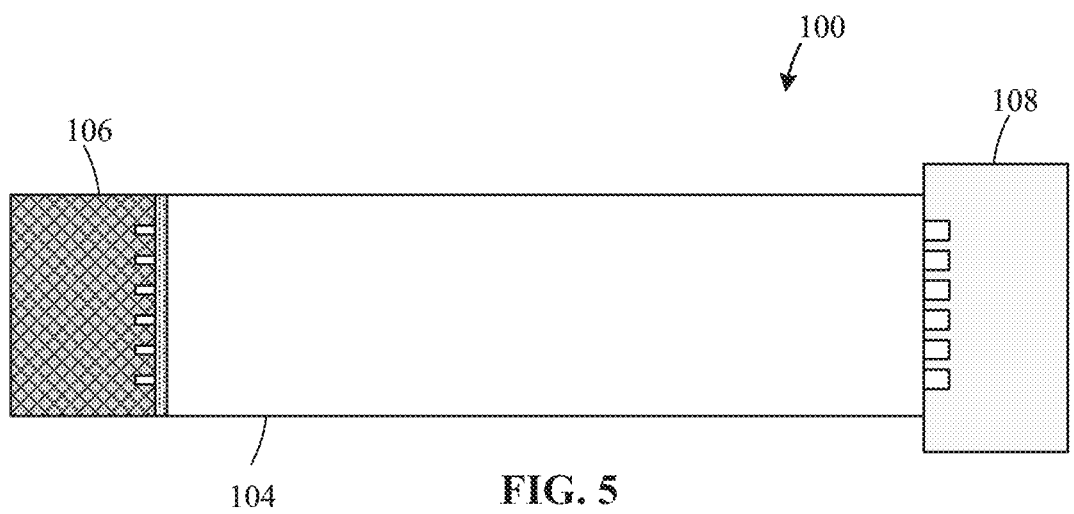
Figure 6:
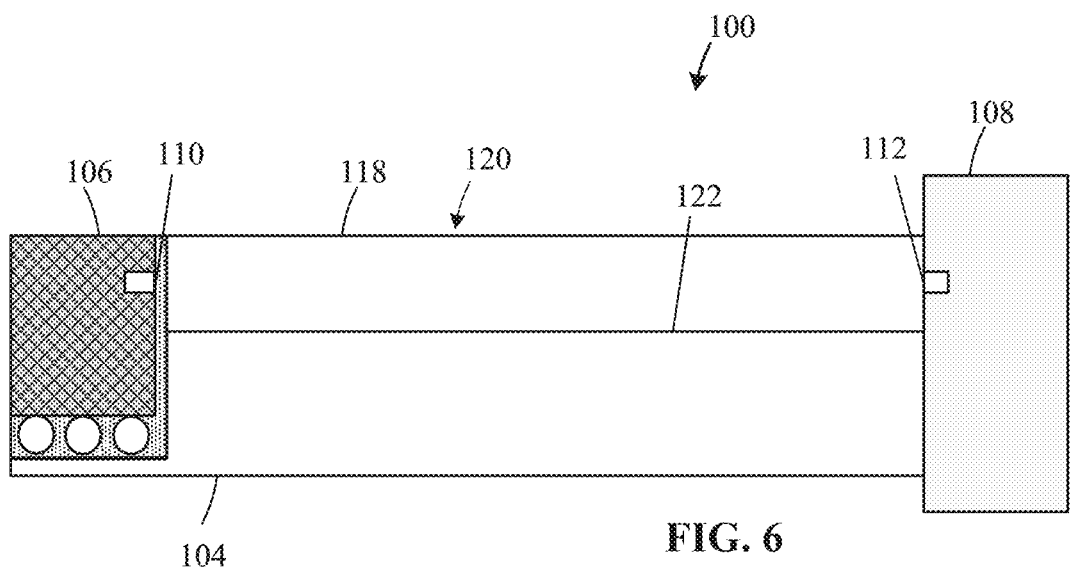
Figure 7:
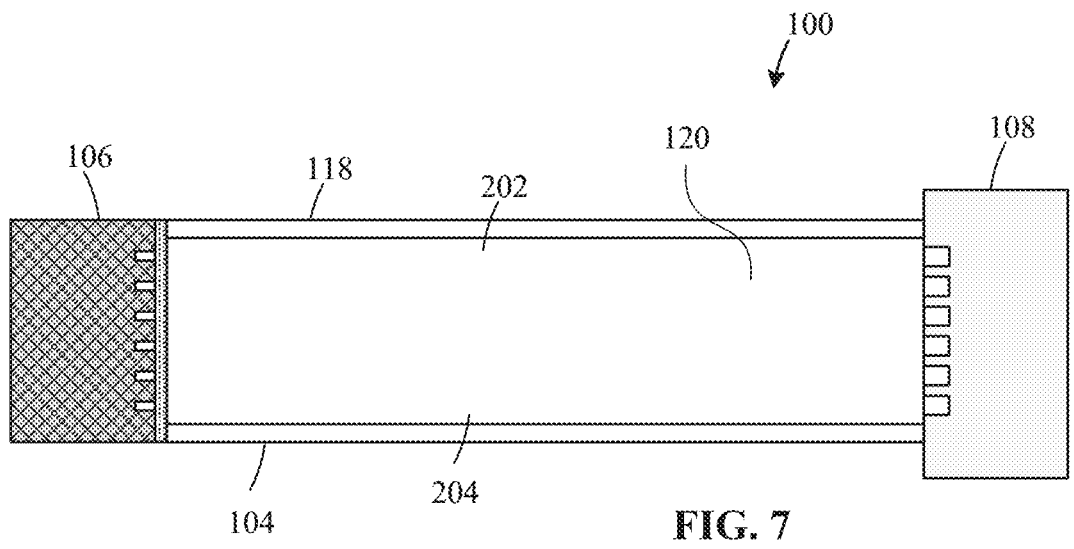

FIGS. 4-9 illustrate various stages of manufacture of the example waveguide structure 100 of FIGS. 1-3. In particular, FIGS. 4 and 5 are cross-sectional and top-down views, respectively, of the waveguide structure 100 showing the example glass substrate 104 (prior to the etching of the channel 120) positioned between the PIC 106 and the FAU 108. FIGS. 6 and 7 are cross-sectional and top-down views, respectively, of the waveguide structure 100 after the deep channel (e.g., trench, cavity, recess, etc.) 120 has been etched into the top surface 118 of the substrate 104. As shown in the illustrated example, the channel 120 extends from the top surface 118 of the substrate 104 down to the recessed surface 122 of the substrate 104, which is below the bottom edges of the optical output 110 and the optical input 112. The recessed surface 122 of the substrate 104 corresponds to a channel bottom that extends from a first sidewall 202 to a second sidewall 204.

Figure 8:
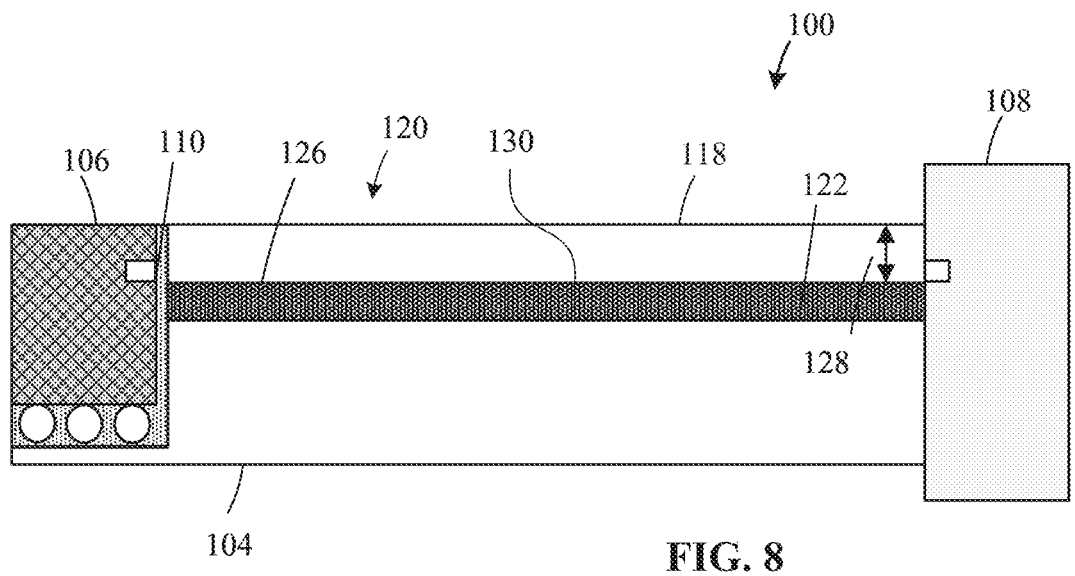
Figure 9:
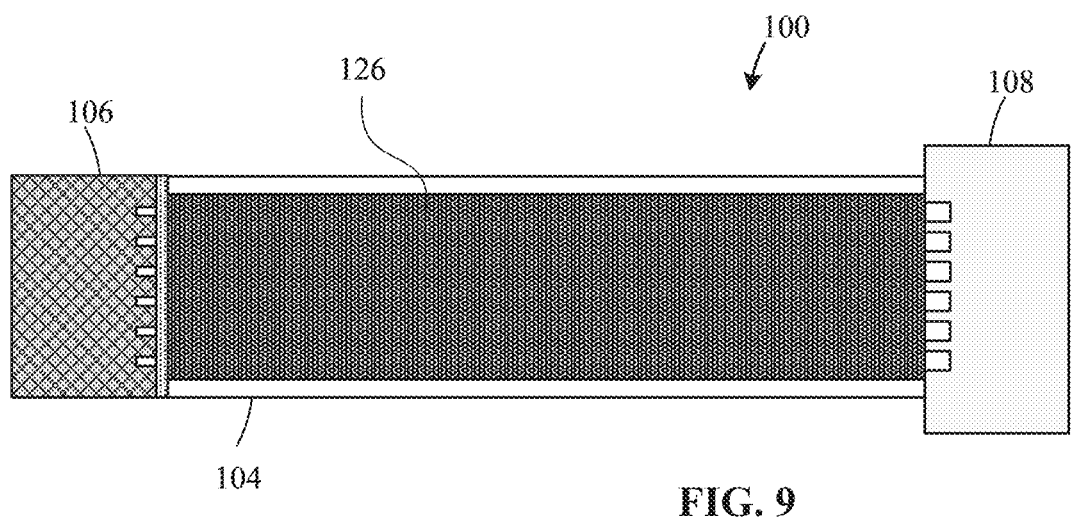

FIGS. 8 and 9 are cross-sectional and top-down views, respectively, of the waveguide structure 100 after a buffer layer 126 has been deposited in the channel 120 onto the recessed surface 122 of the substrate 104. At this point in the process, the buffer layer 126 extend continuously across the width of the channel 120. However, in some examples, the buffer layer 126 may be divided into separate portions as shown in FIG. 3 through an etching process. In other examples, the buffer layer 126 remains as a continuous span of material across the width of the channel 120. As represented in FIG. 8, the buffer material is deposited until the upper surface 130 of the buffer layer 126 reaches, but does not surpass, the bottom edge of the optical outputs 110. With the upper surface 130 of the buffer layer 126 precisely controlled to the desired z-position 128, example waveguide material can be deposited at the desired x- and y-positions and then surrounded and/or enclosed by the filler material 132, as shown in FIGS. 1-3.

FIGS. 10-15 illustrate various stages of manufacture of another example waveguide structure 1500 (shown in FIG. 15) with a plurality of waveguides in a single channel. The stages of manufacture represented in FIGS. 10-15 are similar to some of the stages of manufacture represented in FIGS. 4-9. However, additional fabrication operations not discussed in connection with FIGS. 4-9 are detailed in connection with FIGS. 10-15. Further, for purposes of explanation, FIGS. 10-15 have been simplified relative to FIGS. 4-9 to produce a waveguide structure with only two waveguides. However, any suitable number of waveguides may be implemented. Despite these differences between FIGS. 10-15 and FIGS. 1-9, similar reference numerals will be used for similar parts in describing FIGS. 10-15.

Figure 10:
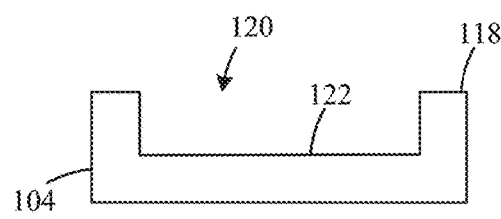
FIGS. 10-15 illustrate various stages of manufacture of another example waveguide structure similar to the waveguide structure of FIG. 1-9 with a plurality of waveguides in a single channel.
Figure 11:
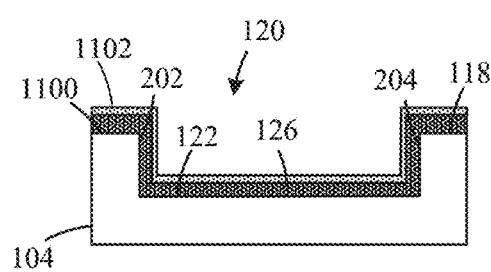

Turning in detail to the drawings, FIG. 10 illustrates a channel 120 etched into a top surface 118 of a substrate 104. The channel 120 extends from the top surface 118 of the substrate 104 toward a recessed surface 122 of the substrate 104. As described above, the etching of the channel 120 is a relatively coarse process that does not provide particularly high levels of control of the depth of the etch. FIG. 11 illustrates a first buffer material 1100 and a second buffer material 1102 deposited onto the recessed surface 122. In this example, the layer of the first buffer material 1100 and the layer of the second buffer material 1102 collectively correspond to the buffer layer 126. In this example, the first buffer material 1100 has constant index of refraction throughout its volume, whereas the second buffer material 1102 has an index of refraction that incrementally differs across its thickness to create a graded index of refraction at the interface between the buffer layer 126 and the waveguides 102. In some examples, the gradation of the index of refraction is achieved by depositing multiple layers of different materials with different indices of refraction to form the layer corresponding to the second buffer material 1102. Additionally or alternatively, in some examples, a dopant affecting the index of refraction is diffused into the second buffer material 1102 to create the graded index of refraction. In some such examples, the host material that caries the dopant in the second buffer material 1102 corresponds to a portion of the first buffer material 1100. That is, in some examples, the entirety of the buffer layer 126 is formed of the same material with the first and second buffer materials 1100, 1102 shown in the figure distinguished by a dopant being diffused into the second buffer material 1102. To distinguish the two materials, the second buffer material 1102 is sometimes referred to herein as a graded index of refraction material and the region associated with the second buffer material 1102 is sometimes referred to herein as a refraction grading region or refraction grading layer. In some examples, if an index of refraction grading is not needed, the second buffer material 1102 is omitted and the first buffer material 1100 corresponds to the entire thickness of the buffer layer 126. FIGS. 1-9 are an example waveguide structure 100 without a refraction grading at the interface between the buffer layer 126 and the waveguides 102.

Figure 12:
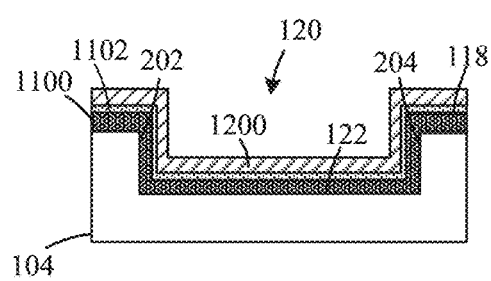

In some examples, a directional deposition technique (e.g., e-beam evaporation) is used when depositing the buffer materials 1100, 1102, which provides relatively high control of the z-position of the upper surface of the material being added, thereby enabling precise control of a final height (e.g., depth) of the upper surface 130 of the buffer layer 126. While the deposition of the buffer material is highly directional, it is likely that at least some of the material will be deposited onto the sidewalls 202, 204 of the channel 120 in addition to the recessed surface 122 of the substrate 104, as shown in FIG. 11. Further, as represented in FIG. 11, the nature of the deposition process is such that the buffer material will also be deposited onto the top surface 118 of the substrate 104. FIG. 12 illustrates a waveguide material 1200 being deposited onto the buffer material 1100, 1102. In some examples, the same deposition technique used for the buffer material 1100, 1102 is used for waveguide material 1200. Accordingly, as shown in the illustrated example, the waveguide material 1200 will cover the buffer material 1100, 1102 at the bottom of the channel 120, on the sidewalls 202, 204, and on the upper surface 118 of the substrate 104.

Figure 13:
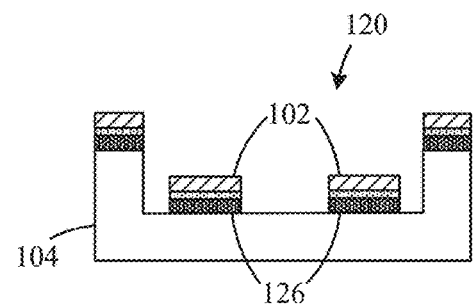

FIG. 13 illustrates the process after unwanted portions of the buffer material 1100, 1102 and the waveguide material 1200 within the channel 120 have been removed. What remains after removal of the unwanted portions of the material is the final shape for the waveguides 102 atop the corresponding portions of the buffer layer 126 (which includes the second buffer material 1102 corresponding to a refraction grading region and the underlying first buffer material 1100). In some examples, the buffer material 1100, 1102 and the waveguide material 1200 are removed using a suitable technique, such as a dry etching technique.

Figure 14:
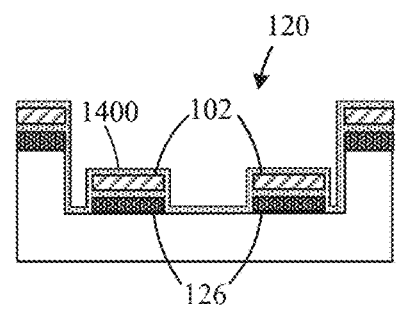

FIG. 14 illustrates the process after depositing a graded index of refraction material 1400 over top of the waveguides 102 as well other exposed surfaces of the assembly. In some examples, the graded index of refraction material 1400 has a similar grading to that of the second buffer material 1102 underneath the waveguides 102. As a result, the waveguides 102 become fully surrounded by material with a graded index of refraction. In some examples, if an index of refraction grading is not to be included (as in the illustrated example of FIGS. 1-9), the graded index of refraction material 1400 is omitted.

Figure 15:
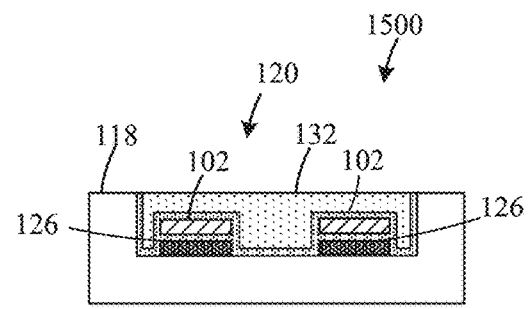

FIG. 15 illustrates the completed waveguide structure 1500 after removal of the buffer material 1100, 1102, the waveguide material 1200, and the graded index of refraction material 1400 from the upper surface 118 of the substrate 104 and the filler material 132 is deposited. In some examples, a grinding technique (e.g., planarization) is used to remove the deposited materials 1100, 1102, 1200, 1400 on the top surface 118. However, other techniques may be used additionally or alternatively. For example, a release layer can be added to the upper surface 118 of the substrate 104 prior to the deposition process and then removed after the deposition processes. As shown in the illustrated example, the filler material 132 is deposited within the channel 120 adjacent the graded index of refraction material 1400, the waveguide 102, and the buffer layer 126. In some examples, the filler material 132 fills a space extending a full distance from a first one of the waveguides 102 (as surrounded by the graded index of refraction material 1400) to the second one of the waveguides 102 (as surrounded by the graded index of refraction material 1400). In some examples, the filler material coats (e.g., surrounds, encloses) the waveguides 102. In some examples, the filler material surrounds exposed portions of the buffer material.

Figure 16:
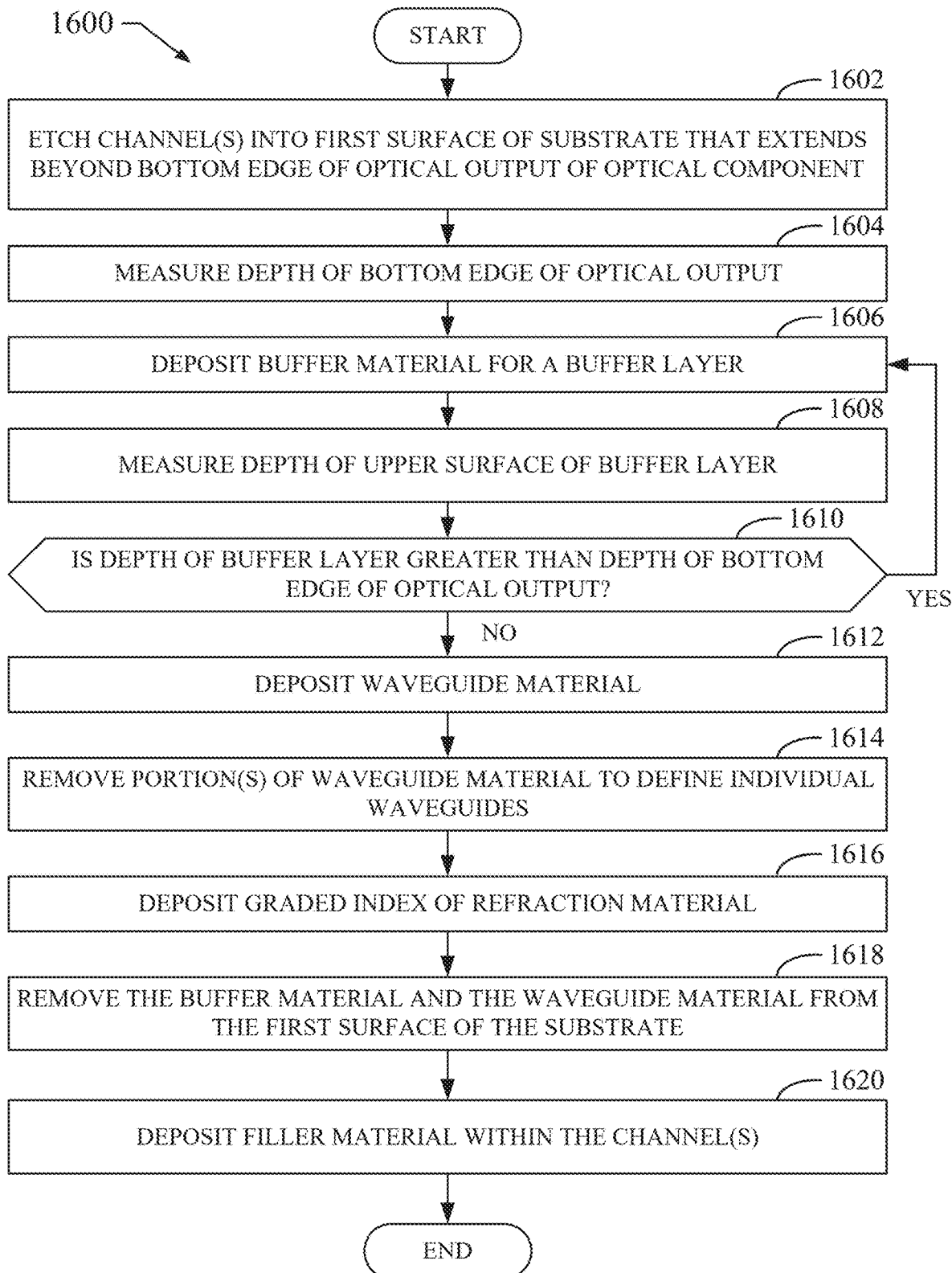
FIG. 16 is a flowchart representative of an example method of manufacturing the example waveguide structures of either FIGS. 1-9 or FIGS. 10-15.

FIG. 16 is a flowchart representative of an example method 1600 of creating an example waveguide structure (such as the waveguide structure 100, 1500 of either FIGS. 1-9 or FIGS. 10-15) with a plurality of waveguides in a single channel. The process begins with a substrate (e.g., the substrate 104) positioned between a first optical component having one or more optical outputs (e.g., the optical outputs 110 of the PIC 106) and a second optical component having one or more corresponding optical inputs (e.g., the optical inputs 112 of the FAU 108). Accordingly, the optical outputs 110 and the optical inputs 112 are adjacent opposite sides of the substrate 104.

At block 1602, the method includes etching a channel (e.g., the channel 120) into a first surface (e.g., the upper surface 118) of the substrate 104 that extends beyond a bottom edge of the optical outputs 110. At block 1604, the method includes measuring a depth of a bottom edge of the optical output 110 of the optical component (e.g., the PIC 106). That is, the measured depth corresponds to the distance from the upper surface 118 of the substrate 104 to the bottom edge of the optical output 110. This depth defines the target depth or z-position 128 for the waveguide 102.

At block 1606, the method includes depositing a buffer material for a buffer layer (e.g., the buffer layer 126). In some examples, the buffer material used for the buffer material can include multiple different materials with different indices of refraction, such as the first and second buffer materials 1100, 1102, to enable the creation of an index of refraction grading. In other examples, the buffer layer 126 includes only a single material with a constant index of refraction. In this example, the buffer material has a first index of refraction. At block 1608, the method includes measuring a depth of an upper surface (e.g., the upper surface 130) of the buffer layer 126. Similar to the depth measured at block 1604, the depth measured at block 1608 corresponds to the distance from the upper surface 118 of the substrate 104 to the upper surface 130 of the buffer layer 126. At block 1610, the method includes determining whether the depth of the buffer layer 126 is greater than the depth of the bottom edge of the optical output 110. As discussed above, because etching into the substrate 104 does not allow for precise control of the depth of the etch (e.g., the z-position of the trench bottom), the deposition of buffer material is used to provide z-position control for the waveguide relative to the optical output 110. The measuring of the upper surface 130 of the buffer layer 126 (block 1608) and the comparison of such to the depth of the bottom edge of the optical output (measured at block 1604) enables a feedback loop to determine when to add more buffer material and when to stop adding the buffer material. Thus, if the answer to the determination at is YES, the method 1600 goes back to block 1606.

As mentioned above, in some examples, the added buffer material has a consistent index of refraction throughout successive iterations of blocks 1606-1610. In other examples, different layers of the buffer material may have incrementally differing indexes of refraction to create a graded refraction interface between the buffer layer and the waveguide. Additionally or alternatively, the buffer material includes a gradation of indices of refraction based on a dopant diffused within its structure. In some examples, the incremental changes or gradation in the index of refraction only begin when the difference between the depth of the buffer layer 126 and the bottom edge of the optical output is less than a threshold. In this manner, the graded refraction interface will be limited to a region in close proximity to the waveguide.

The example method of FIG. 16 iterates through blocks 1606-1610 until the answer to block 1610 is NO. At this point, the buffer layer 126 is fully deposited with the upper surface 130 of the buffer layer having reached, but not surpassed, the optical output 110. The buffer layer 126 is now at a position such that the bottom edge of the optical component will align with the waveguide relative to the z-position. Accordingly, at block 1612, waveguide material is deposited onto the buffer layer 126. The waveguide is the structure that provides a path for an optical signal to travel between the first and second optical components. Thus, the waveguide material has a second index of refraction which is higher than the first index of refraction (of the buffer material) to restrict the spatial region along which a light (e.g., the optical signal) can propagate. In some examples, the waveguide material may be added in multiple layers with incrementally different indexes of refraction to facilitate generation of a graded refraction interface as mentioned above. In some examples, the graded refraction interface extends into both the buffer layer 126 and the waveguide 102. In other examples, the graded refraction interface may be fabricated exclusive in either one of the buffer layer 126 or the waveguide 102.

At block 1614, the example method includes removing portions of the waveguide material to define individual waveguides 102. In some examples, corresponding portions of the buffer material are also removed. In other examples, some or all of the buffer material may be retained while the portions of the waveguide material are removed. At block 1616, the example method includes depositing a graded index of refraction material (e.g., graded index of refraction material 1400) to create a graded refraction interface at the exposed surfaces of the waveguide material (e.g., the sides and top surface of the waveguide 102). In some examples, where a graded index of refraction is not to be included, block 1616 may be omitted. At block 1618, the method includes removing the graded index of refraction material (if added), the buffer material, and the waveguide material from the first surface (e.g., upper surface, top surface) 118 of the substrate 104.

At block 1620, the method includes depositing a filler material (e.g., the filler material 132) within the channel 120. In some examples, the filler material 132 is to fill open spaces within the channel 120. In some examples, the filler material surrounds the waveguides 102. Thus, in some examples, the filler material 132 fills the gaps between the waveguides 102 and the first and second sidewalls 202, 204. Further, in some examples, the filler material 132 fills a space between facing surfaces of adjacent waveguides 102. In some examples, the filler material 132 has an index of refraction that matches the first index of refraction of the buffer material so that the waveguides 102 are entirely surrounded by material having the same index of refraction.

While an example method of manufacturing the example waveguide structures 100, 1500 of FIGS. 1-16 is illustrated in FIG. 10, one or more of the blocks in FIG. 10 may be combined, divided, re-arranged, omitted, eliminated, and/or implemented in any other way.

Figure 17:
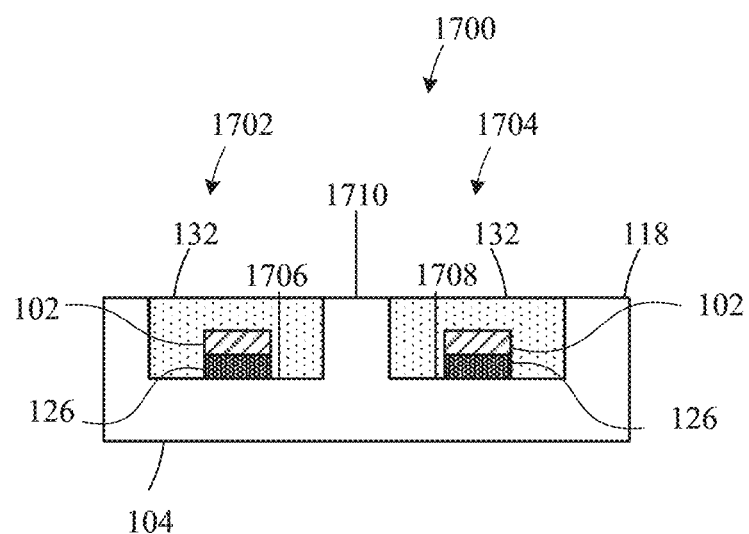
FIG. 17 is a cross-sectional view of another example waveguide structure with separate waveguides in separate channels.

FIG. 17 is a cross-sectional view of another example waveguide structure 1700 with separate waveguides in separate channels. The waveguide structure 1700 of FIG. 17 is similar to the waveguide structure 100 of FIGS. 1-9 and the waveguide structure 1500 of FIGS. 10-16. As such, the details of the parts of the waveguide structure 1700 of FIG. 17 that are common with the parts of the waveguide structure 100, 1500 of FIGS. 1-16 will not be described in detail again in connection with FIG. 17. Further, the same reference numbers used for structures shown in FIGS. 1-16 will be used for similar or identical structures in FIG. 17. In this example, there is no index of refraction grading that surrounds the waveguides 102. However, an index of refraction grading could be included following similar fabrication processes described above in connection with FIGS. 10-16. Similar to FIGS. 1-16, the waveguide structure 1700 of FIG. 17 is fabricated directly onto a substrate which is situated between a first optical component (e.g., PIC 106 having an array of outputs 110) and a second optical component (e.g., FAU 108 having an array of inputs 112).

A primary difference between the example waveguide structure 1700 of FIG. 17 and the waveguide structures 100, 1500 of FIGS. 1-16 is that each of the waveguides 102 are within separate channels 1702, 1704 etched into an upper surface (e.g., the upper surface 118) of a substrate (e.g., the substrate 104). Thus, as shown in the illustrated example of FIG. 17, separate portions of the buffer layer 126 are positioned on corresponding recessed surfaces 1706, 1708 at the bottom of the first and second channels 1702, 1704 to support the separate waveguides 102. Further, each of the channels 1702, 1704 are separately filled with the filler material 132 to encircle or enclose the separate waveguides 102. Stated differently, the example waveguide structure 1700 of FIG. 17 is similar to the waveguide structures 100, 1500 of FIGS. 1-16 except that the waveguide structure 1700 of FIG. 17 includes a portion 1710 of the substrate 104 positioned between the separate waveguides 102 and defines the sidewalls of the adjacent channels 1702, 1704.

Although two separate channels 1702, 1704 are illustrated in FIG. 17, any suitable number of channels may be implemented. Further, in some examples, one or more of the separate channels 1702, 1704 include more than one waveguide 102. In some such examples, each of the separate channels 1702, 1704 include the same number of waveguides 102. In other examples, different ones of the channels 1702, 1704 include different numbers of waveguides 102 positioned therein. In some examples, the number of waveguides 102 and/or number of channels 1702, 1704 depends on the nature and/or spacing of the optical component inputs and/or outputs to which the waveguides 102 are to be aligned.

Figure 18:
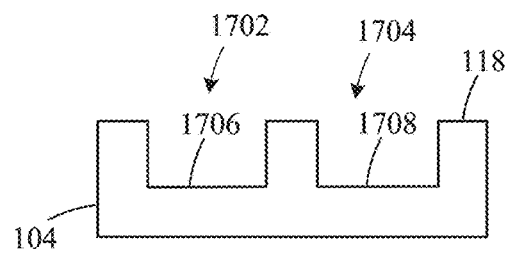
FIGS. 18-23 illustrate various stages of manufacture of the example waveguide structure of FIG. 17.
Figure 21:
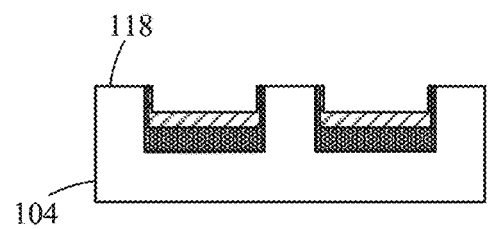
Figure 19:
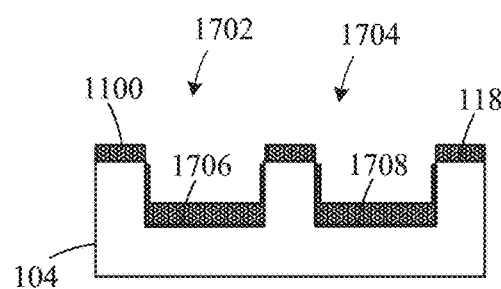
Figure 22:
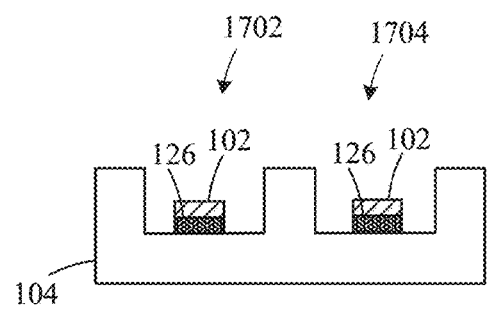
Figure 20:
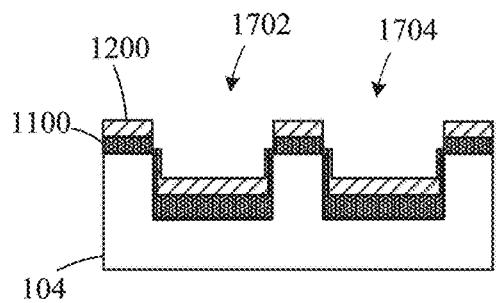
Figure 23:
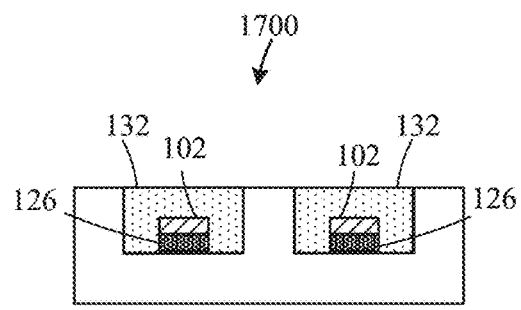

FIGS. 18-23 illustrate various stages of manufacture of the example waveguide structure 1700 of FIG. 17. In particular, FIG. 18 illustrates the first and second channels 1702, 1704 etched into the upper surface 118 of the substrate 104. FIG. 19 illustrates buffer material 1100 deposited onto etched substrate 104 so that buffer material 1100 is concurrently deposited into both of the recessed surfaces 1706, 1708. FIG. 20 illustrates a waveguide material 1200 deposited onto the buffer material 1100. FIG. 21 illustrates the process after removal of the buffer material 1100 and the waveguide material 1200 from the upper surface 118 of the substrate 104. FIG. 22 illustrates the process after unwanted portions of the buffer material 1100 and the waveguide material 1200 have been removed. What remains after removal of the unwanted material is the structure for each waveguide 102 in each channel 1702, 1704 situated atop a corresponding portion of the buffer layer 126. In some examples, different segments of the waveguide material 1200 may be removed between the sidewalls of a single channel 1702, 1704 (similar to what is described in relation to FIGS. 1-16) to create a plurality of waveguides 102 within the corresponding channel 1702, 1704. In some examples, the buffer material 1100 may be removed as well. FIG. 22 illustrates the completed waveguide structure 1700 of FIG. 17 after a filler material 132 is deposited within each channel 1702, 1704. In some examples, the filler material coats (e.g., surrounds, encloses) the waveguides 102.

Figure 24:
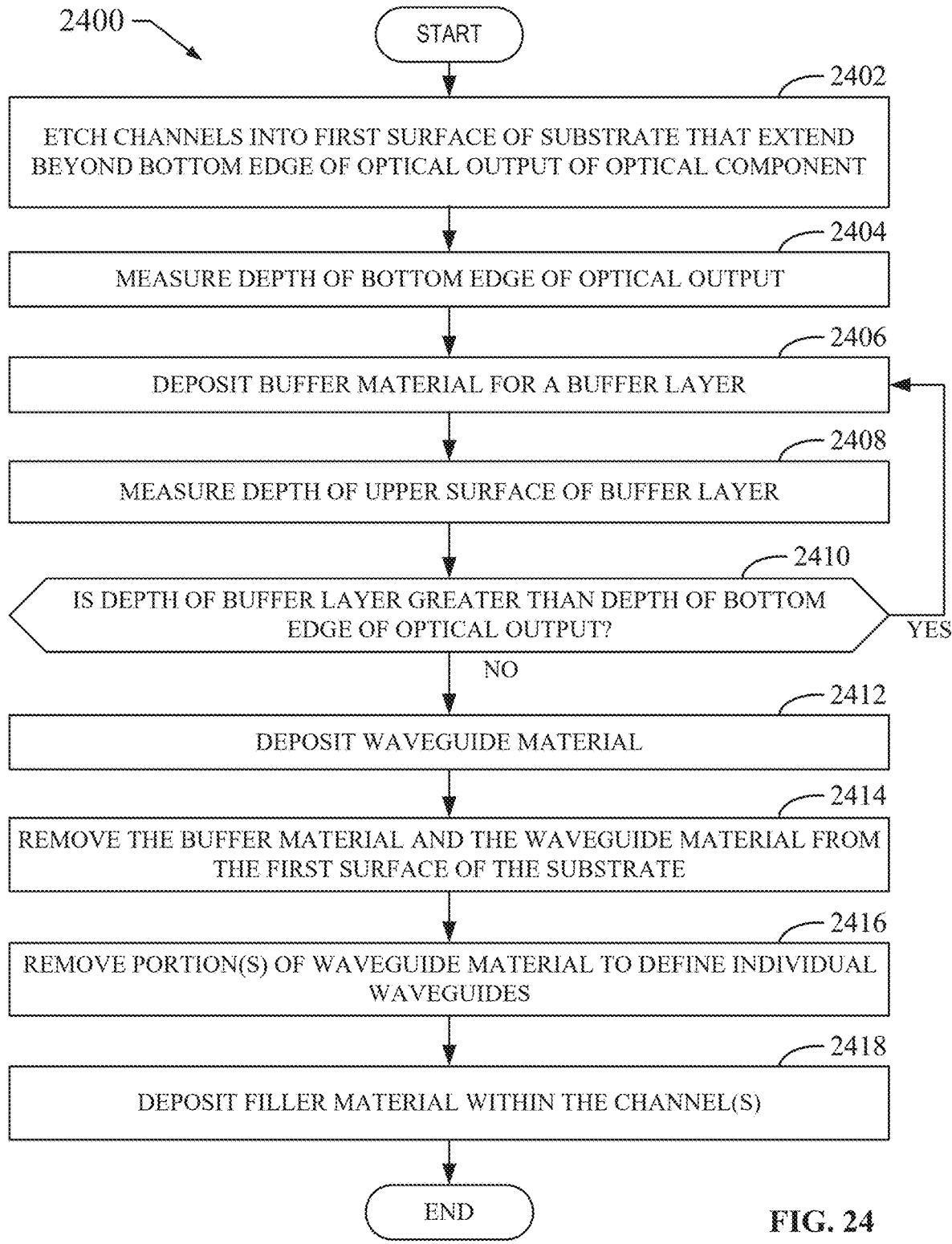
FIG. 24 is a flowchart representative of an example method of manufacturing the example waveguide structure of FIGS. 17-23.

FIG. 24 is a flowchart representative of an example method 2400 of creating the example waveguide structure 1700 of FIGS. 17-23. The process begins with a substrate (e.g., the substrate 104) positioned between a first optical component having one or more optical outputs (e.g., the optical outputs 110 of the PIC 106) and a second optical component having one or more corresponding optical inputs (e.g., the optical inputs 112 of the FAU 108). At block 2402, the method includes etching channels (e.g., channel 1702, 1704) into a first surface (e.g., the upper surface 118) of the substrate 104, with the channels 1702, 1704 extending beyond (e.g., in a depth direction) a bottom edge of an optical output 110 of the optical component (e.g., the PIC 106). In this example, the different channels 1702, 1704 are separated by a portion 1710 of the substrate 104 that remains intact after the etching of block 2402. That is, the portion 1710 dividing adjacent ones of the channels 1702, 1704 extends upward from the recessed surfaces to the upper surface 118 of the substrate. In some examples, blocks 2404-2418 are performed for each channel created at block 2404 concurrently. Further, in some examples, blocks 2404-2412 are implemented in the same manner as described above in connection with blocks 1604-1612 of FIG. 16. Further, block 2414 and 2416 are implemented in a similar manner to blocks 1614 and 1618 of FIG. 16 except that the order of operations for blocks 2414 and 2416 of FIG. 24 are reversed relative to the order of operations for blocks 1614 and 1618 of FIG. 16. Finally, block 2418 is implemented in the same manner as described above in connection with blocks 1620 of FIG. 16.

While an example method of manufacturing the example waveguide structures 1700 of FIGS. 17-23 is illustrated in FIG. 24, one or more of the blocks in FIG. 24 may be combined, divided, re-arranged, omitted, eliminated, and/or implemented in any other way.

Figure 25:
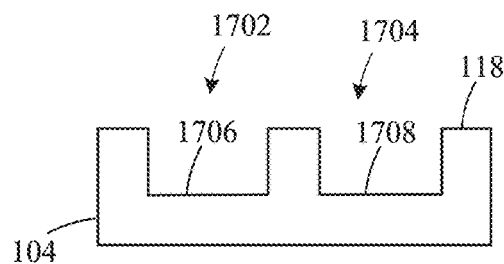
FIGS. 25-30 illustrate various stages of manufacture of another example waveguide structure similar to the example waveguide structure of FIG. 17.

FIGS. 25-30 illustrate various stages of manufacture of another example method of creating the example waveguide structure 1700 of FIG. 17. Accordingly, similar reference numbers will be used to refer to the same or similar structures. Further, aspects of the example method represented by FIGS. 25-30 may be adapted for use in connection with the fabrication of the waveguide structures described in connection with FIGS. 1-16. More generally, although FIGS. 25-20 illustrate the various stages of manufacture for an example waveguide structure 1700 with two waveguides 102 in separate channels 1702, 1704, the method can be applied to manufacture any waveguide structure with any suitable number of channels containing any suitable number of waveguides. Further, in the illustrated example of FIGS.

25-30, there is no index of refraction grading that surrounds the waveguides 102. However, an index of refraction grading could be included following similar fabrication processes described above in connection with FIGS. 10-16.

FIG. 25 illustrates two channels 1702, 1704 etched into a top surface 118 of a substrate 104 extending to corresponding recessed surfaces 1706, 1708 of the substrate 104. Thus, the stage of manufacture represented by FIG. 25 is the same as that represented in FIG. 18 above. As noted above, the deposition of the buffer material and the waveguide material involves the material being deposited on all surfaces of the substrate 104 including the upper surface 118, the sidewalls of the channels 1702, 1704, as well as the recessed surfaces 1706, 1708. However, the buffer material and the waveguide material are only needed on the recessed surfaces 1706, 1708 where the resulting waveguides 102 are to be positioned. Accordingly, in some examples, to avoid the deposition of unwanted material at certain locations and/or to avoid certain operations to remove such unwanted material once deposited, a release layer material 2602 is positioned on the first surface 118 of the substrate 104 prior to the deposition of the buffer material and the waveguide material. In this manner, the release layer material 2602 can capture the unwanted material before it is deposited directly onto the upper surface 118. Furthermore, as shown in the illustrated example, the release layer material 2602 is positioned to overhang portions of the channels 1702, 1704 adjacent the sidewalls 2604 of the channels 1702, 1704 to block the buffer material and the waveguide material from being deposited on sidewalls 2604. Any suitable material can be used as release layer material 2602.

Figure 28:
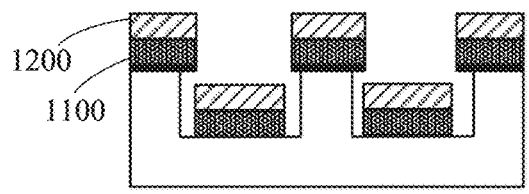
Figure 26:
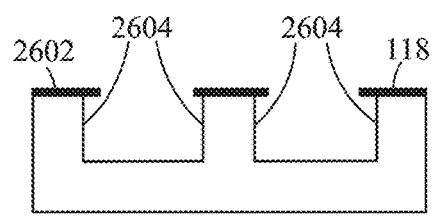
Figure 29:
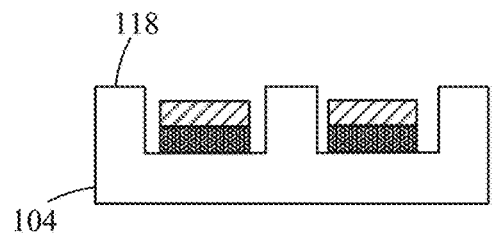
Figure 27:
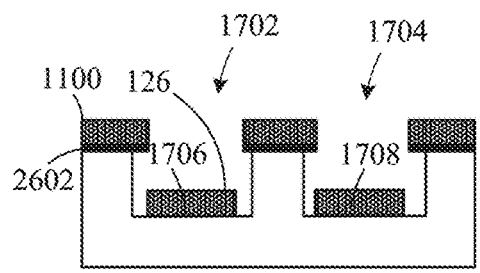
Figure 30:
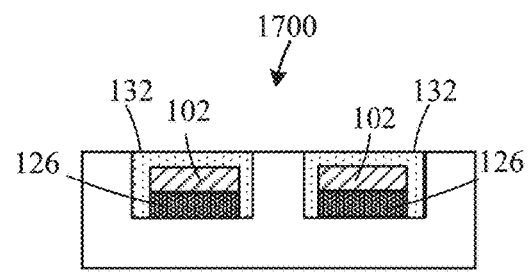

FIG. 27 illustrates buffer material 1100 deposited onto the recessed surfaces 1706, 1708 to form a buffer layer 126. The release layer material 2602 catches the buffer material 1100 deposited onto the first surface 118 of the substrate 104 so as to be between the first surface 118 and the buffer material 1100. Additionally, because the release layer material 2602 overhangs portions of the channels 1702, 1704, the release layer material 2602 also prevents deposition of the buffer material on and/or directly adjacent the sidewalls 2604 of the channels 1702, 1704. Thus, in this example, the buffer material 1100 that is deposited onto the recessed surfaces 1706, 1708 within the channels 1702, 1704 are spaced apart from the sidewalls 2604. FIG. 28 illustrates a waveguide material 1200 being deposited onto the buffer material 1100. Similar to the buffer material 1100, the waveguide material 1200 deposited within the channels 1702, 1704 is spaced apart from the sidewalls 2604. FIG. 29 illustrates the process after removal of the release layer material 2602 from the upper surface 118 of the substrate 104. Inasmuch as the release layer material 2602 is positioned between the first surface 118 of the substrate 104 and the unwanted portions of the buffer material 1100 and the waveguide material 1200, removal or release of the release material layer results in the remove of the unwanted portions of the buffer material 1100 and the waveguide material 1200. Thus, separate removal processes to remove the unwanted material as described in relation to FIGS. 1-16 is unnecessary. Furthermore, inasmuch as the portions of the buffer materials 1100 and the waveguide material 1200 within the channels 1702, 1704 is already spaced apart from the sidewalls 2604, removal of the unwanted portions of the deposited materials within the channels 1702, 1704 is also unnecessary. That is, in some examples, the width of the buffer material 1100 and the waveguide material 1200 deposited within the channels 1702, 1704 (e.g., between the overhanging portions of the release layer material 2602) corresponds to the width for the final waveguide 102. Thus, in some examples, the widths of the channels 1702, 1704 and the extent of the overhang of the release layer material 2602 are defined based on the intended dimension of the waveguides 102. In other examples, the waveguide material 1200 deposited within the channels 1702, 1704 may be segmented by removing unwanted portions between opposite ends of the material to define multiple different waveguides within each channel 1702, 1704. FIG. 30 illustrates the completed waveguide structure 1700 after a filler material 132 is deposited within each channel 1702, 1704 adjacent the waveguide 102 and the buffer layer 126 of the channels.

Figure 31:
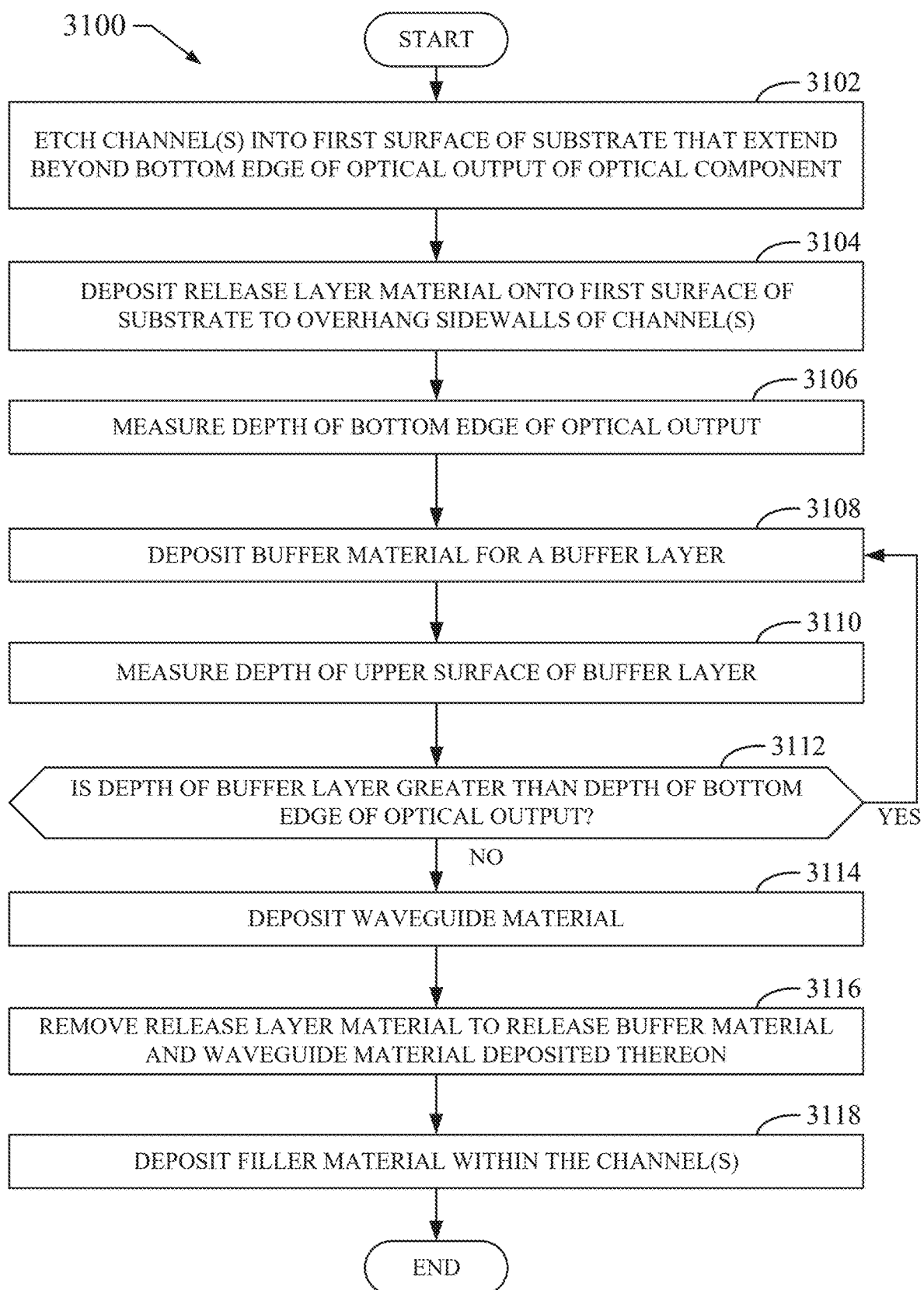
FIG. 31 is a flowchart representative of an example method of manufacturing the example waveguide structure of FIGS. 25-30.

FIG. 31 is a flowchart representative of an example method 3100 of manufacturing the example waveguide structure 1700 of FIG. 17 following the process flow detailed in FIGS. 25-30. The method of manufacture illustrated in FIGS. 25-30 and described in FIG. 31 may be applied additionally and/or alternatively to the examples waveguide structures of FIGS. 1-24. The process begins with a substrate (e.g., the substrate 104) positioned between a first optical component having one or more optical outputs (e.g., the optical outputs 110 of the PIC 106) and a second optical component having one or more corresponding optical inputs (e.g., the optical inputs 112 of the FAU 108). At block 3102, the method includes etching at least one channel (e.g., the channels 1702, 1704) into a first surface (e.g., the upper surface 118) of the substrate 104 that extends beyond a bottom edge of the optical outputs 110. At block 3104, the method includes depositing a release layer material (e.g., release layer 2602) onto the first surface 118 of the substrate 104 to cover the first surface 118 and overhang sidewalls (e.g., the sidewalls 2604) of the channel(s) 1702, 1704. Blocks 3106-3114 are implemented in the same manner as described above in connection with blocks 1604-1612 of FIG. 16 and blocks 2404-2412 of FIG. 24. However, the effect of implementing blocks 3106-3114 of FIG. 31 is different than either FIG. 16 or FIG. 24 because of the overhanging release layer material 2602. In particular, as the buffer material 1100 is deposited (block 3108) and the waveguide material 1200 is deposited (block 3114), the portion that is deposited within the channel(s) 1702, 1704 will be spaced apart from the associated sidewalls (as shown in FIG. 28). At block 3116, the method includes removing the release layer material 2602 to release the buffer material 1100 and the waveguide material 1200 deposited thereon. At block 3112, the method includes depositing a filler material (e.g., the filler material 132) within the channel(s) 1702, 1704.

While an example method of manufacturing the example waveguide structures 1700 of FIGS. 17 and 25-30 is illustrated in FIG. 31, one or more of the blocks in FIG. 31 may be combined, divided, re-arranged, omitted, eliminated, and/or implemented in any other way.

Although each example waveguide structure 100, 1500, 1700 as described in FIGS. 1-15, 17-23, and 25-30 and disclosed above have certain features, it should be understood that it is not necessary for a certain feature of one example waveguide structure 100, 1500, 1700 to be used exclusively with that example. Instead, any of the features of the examples waveguide structures 100, 1500, 1700 described above and/or depicted in the drawings can be combined with any of the example waveguide structures of other examples. Similarly, the methods of manufacturing example waveguide structures 100, 1500, 1700 as described in FIG. 16, FIG. 24, and FIG. 31 can be combined, divided, re-arranged, omitted, eliminated, and/or implemented in any other way.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed that enable the fabrication of position controlled waveguides that facilitate the transfer of optical signals between two or more components of a circuit. More particularly, increased alignment of the waveguide to the optical component inputs and/or outputs is achieved relative to the z-position by etching a channel into a substrate that extends to a depth (e.g., z-position) beyond the optical component inputs and/or outputs and depositing a buffer layer to a desired z-position that aligns with the optical inputs and/or outputs. That is, the buffer layer is deposited onto the bottom surface of a deep trench or channel until it reaches, but does not surpass, the bottom edge of the optical component input and/or output thereby providing a desired z-position on which to deposit waveguide material. The increased alignments allows for better transmission of the optical signals between optical components, thereby increasing data rate signaling and increasing bandwidth.

Example 1 includes an apparatus comprising a substrate, the substrate including a channel that extends into a first surface of the substrate to a second surface of the substrate, the second surface recessed relative to the first surface: a buffer material on the second surface of the substrate, the buffer material having a first index of refraction; and a waveguide on the buffer material, the waveguide having a second index of refraction that is higher than the first index of refraction.

Example 2 includes the apparatus of example 1 and further includes a filler material within the channel, the filler material having a third index of refraction that matches the first index of refraction, the filler material to fill a space within the channel surrounding the waveguide.

Example 3 includes the apparatus of example 2, wherein the filler material includes an index matching gel.

Example 4 includes the apparatus of any of examples 1-3, wherein the apparatus further includes a first optical component; and a second optical component, the waveguide positioned to transmit an optical signal between the first optical component and the second optical component.

Example 5 includes the apparatus of example 4, wherein the first optical component corresponds to a photonic integrated circuit and the second optical component corresponds to a fiber array unit.

Example 6 includes the apparatus of any of examples 1-5, wherein the substrate is a glass substrate.

Example 7 includes the apparatus of any of examples 1-6, wherein the waveguide has a first side surface, a second side surface, a bottom surface in contact with the buffer material, and an upper surface, the bottom surface closer to the second surface of the substrate than the upper surface is to the second surface of the substrate, the upper surface closer to the second surface of the substrate than the first surface of the substrate is to the second surface of the substrate.

Example 8 includes the apparatus of any of example 1-7, wherein the waveguide is a first waveguide, the buffer material on the second surface is a first portion of the buffer material, and the channel is a first channel, the apparatus further including a second waveguide on a second portion of the buffer material, the second portion of the buffer material on a third surface of the substrate within a second channel in the substrate.

Example 9 includes the apparatus of example 8, wherein the first channel is adjacent the second channel such that a portion of the substrate between the first channel and the second channel extends between the first waveguide and the second waveguide.

Example 10 includes the apparatus of any of examples 1-7, wherein the waveguide is a first waveguide, and the buffer material includes a first portion and a second portion spaced apart from the first portion, both the first and second portions of the buffer material on the second surface of the substrate, the first waveguide on the first portion of the buffer material, the apparatus further including a second waveguide on the second portion of the buffer material, the first waveguide having a first side surface facing toward a second side surface of the second waveguide.

Example 11 includes the apparatus of example 10 and further includes a filler material to fill a gap between the first side surface and the second side surface, the filler material to have the first index of refraction.

Example 12 includes the apparatus of any of examples 1-11, wherein a portion of the buffer material includes a region adjacent the waveguide that has a graded index of refraction to define a graded refraction interface between the buffer material and the waveguide.

Example 13 includes the apparatus of example 12, wherein the portion of the buffer material includes different layers, each of the different layers having a different index of refraction to define the graded refraction interface.

Example 14 includes a method of manufacturing a waveguide comprising: etching a cavity into a first surface of a substrate, the cavity defined by first and second sidewalls and a second surface, the second surface recessed relative to the first surface: depositing a first material onto the second surface of the substrate, the first material having a first index of refraction; depositing a second material onto the first material, the second material having a second index of refraction that is higher than the first index of refraction; and depositing a third material within the cavity, the first and second materials to be enclosed by the substrate and the third material, the third material having an index of refraction that matches the first index of refraction.

Example 15 includes the method of example 14, wherein the third material includes an index matching gel.

Example 16 includes the method of any of examples 14-15, wherein the cavity is a first cavity, and the sidewalls are first sidewalls, the method further including etching a second cavity into the first surface of the substrate, the second cavity defined by third and fourth sidewalls and a third surface of the substrate, the third surface recessed relative to the first surface, the second cavity spaced apart from the first cavity: depositing the first material onto the third surface of the substrate concurrently with the depositing of the first material onto the second surface of the substrate; and depositing the second material onto the first material within the second cavity concurrently with the depositing of the second material onto the first material within the first cavity.

Example 17 includes the method of example 14, wherein the first and second materials completely cover the second surface of the substrate across a distance between the first and second sidewalls of the channel, the method further including, prior to the depositing of the third material, etching the second material between the first sidewall and the second sidewall to separate a first portion of the second material from a second portion of the second material.

Example 18 includes the method of any of examples 14-17, wherein the substrate is positioned between a first optical component and a second optical component, the first optical component including an optical signal emitter, and the second optical component including an optical signal receiver, the method further including measuring a depth of the cavity to the first material during the deposition of the first material and modifying the deposition of the first material based on the measured depth of the cavity relative to a position of the optical signal emitter and the optical signal receiver to facilitate alignment of the second material with the optical signal emitter and the optical signal receiver.

Example 19 includes the method of any of examples 14-18, wherein the first and second materials completely cover the second surface across a distance between first and second sidewalls, the method further including, prior to the depositing of the third material, etching the second material to create a first gap between the first sidewall and the second material and to create a second gap between the second sidewall and the second material, the third material to fill the first and second gaps.

Example 20 includes the method of example 19 and further includes, prior to the depositing of the third material, etching the first material to extend the first gap toward the second surface between the first sidewall and the first material and to extend the second gap toward the second surface between the second sidewall and the first material.

Example 21 includes the method of any of example 14-18, and further includes, prior to the depositing of the second material onto the substrate, depositing a release layer onto the first surface of the substrate, the release layer to overhang portions of the cavity adjacent the first sidewall and the second sidewall, the overhang of the release layer to block the second material from being deposited directly adjacent the first and second sidewalls to create a first gap between the first sidewall and the second material and to create a second gap between the second sidewall and the second material, the third material to fill the first and second gaps.

Example 22 includes the method of any of examples 14-21 and further includes, prior to the depositing of the second material, depositing multiple layers of buffer material onto the second surface, the multiple layers of buffer material including the first material, each of the multiple layers of buffer material having a different index of refraction to define a graded refraction interface adjacent the second material.

Example 23 includes an apparatus comprising a substrate including a trench in a first surface of the substrate, the trench defined by a first sidewall, a second sidewall facing the first sidewall, and a trench bottom that extends between the first and second sidewalls, a depth of the trench corresponding to a first distance from the first surface to the trench bottom; and a waveguide within the trench, a second distance between the trench bottom and the waveguide being less than the first distance.

Example 24 includes the apparatus of example 23, wherein the waveguide has a first index of refraction, the apparatus further including a layer of material having a second index of refraction which is lower than the first index of refraction, the layer of material positioned between the trench bottom and the waveguide.

Example 25 includes the apparatus of example 24, and further includes a filler material having a third index of refraction that matches the second index of refraction, the filler material to surround portions of the waveguide not in contact with the layer of material.

Example 26 includes the apparatus of example 25, wherein the filler material includes an index matching gel.

Example 27 includes the apparatus of example 24, wherein the waveguide is a first waveguide, the layer of material is a first layer of material, the trench is a first trench, and the trench bottom is a first trench bottom, the apparatus further including a second waveguide within a second trench of the substrate, the second trench including a second trench bottom, and a second layer of material between the second waveguide and the second trench bottom.

Example 28 includes the apparatus of example 27, wherein the first waveguide and the second waveguide are spaced apart with a portion of the substrate positioned therebetween.

Example 29 includes the apparatus of any of examples 23-28, and further includes a first optical component; and a second optical component, the first optical component including an optical output, and second optical component including an optical input, the waveguide aligned with the optical output and the optical input to transmit an optical signal therebetween.

Example 30 includes the apparatus of any of examples 23-29, wherein the substrate is a glass substrate.

Example 31 includes the apparatus of example 23-30, wherein the waveguide is a first waveguide, and further including: a second waveguide within the trench, the second waveguide spaced apart from the first waveguide; and a filler material to fill a space between the first and second waveguides, the filler material to extend a full distance from the first waveguide to the second waveguide.

Although certain examples methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
 a substrate, the substrate including a channel that extends into a first surface of the substrate to a second surface of the substrate, the second surface recessed relative to the first surface;
 a buffer material on the second surface of the substrate, the buffer material having a first index of refraction, the buffer material including a first portion and a second portion spaced apart from the first portion, both the first and second portions of the buffer material on the second surface of the substrate with the second surface extending continuously between the first and second portions;
 a first waveguide on the buffer material, the first waveguide having a second index of refraction that is higher than the first index of refraction; and
 a second waveguide on the second portion of the buffer material, the second waveguide spaced apart from the first waveguide, the first waveguide having a first side surface facing toward a second side surface of the second waveguide.

2. The apparatus of claim 1, including a filler material within the channel, the filler material having a third index of refraction that matches the first index of refraction, the filler material to fill a space within the channel surrounding the first waveguide.

3. The apparatus of claim 2, wherein the filler material includes an index matching gel.

4. The apparatus of claim 1, including:
 a first optical component; and
 a second optical component, the first waveguide to transmit an optical signal between the first optical component and the second optical component.

5. The apparatus of claim 4, wherein the first optical component corresponds to a photonic integrated circuit and the second optical component corresponds to a fiber array unit.

6. The apparatus of claim 1, wherein the substrate is a glass substrate.

7. The apparatus of claim 1, wherein the first waveguide has a third side surface, a bottom surface in contact with the buffer material, and an upper surface, the bottom surface closer to the second surface of the substrate than the upper surface is to the second surface of the substrate, the upper surface closer to the second surface of the substrate than the first surface of the substrate is to the second surface of the substrate.

8. The apparatus of claim 1, wherein the channel is a first channel, the apparatus including a third waveguide on a third portion of the buffer material, the third portion of the buffer material on a third surface of the substrate within a second channel in the substrate.

9. The apparatus of claim 8, wherein the first channel is adjacent the second channel such that a portion of the substrate between the first channel and the second channel extends between the first waveguide and the third waveguide.

10. The apparatus of claim 1, wherein part of the buffer material includes a region adjacent the first waveguide that has a graded index of refraction to define a graded refraction interface between the buffer material and the waveguide.

11. The apparatus of claim 10, wherein the part of the buffer material includes different layers, each of the different layers having a different index of refraction to define the graded refraction interface.

12. The apparatus of claim 1, including a filler material to fill a gap between the first side surface and the second side surface, the filler material to have the first index of refraction.

13. A method of manufacturing a waveguide, the method comprising:
 etching a cavity into a first surface of a substrate, the cavity defined by first and second sidewalls and a second surface, the second surface recessed relative to the first surface;
 depositing a first material onto the second surface of the substrate, the first material having a first index of refraction;
 depositing a second material onto the first material, the second material having a second index of refraction that is higher than the first index of refraction, the first and second materials to completely cover the second surface of the substrate across a distance between the first and second sidewalls of the cavity;
 etching the second material between the first sidewall and the second sidewall to separate a first portion of the second material from a second portion of the second material; and
 depositing a third material within the cavity, the first and second materials to be enclosed by the substrate and the third material, the third material having an index of refraction that matches the first index of refraction.

14. The method of claim 13, wherein the cavity is a first cavity, the method including:
 etching a second cavity into the first surface of the substrate, the second cavity defined by third and fourth sidewalls and a third surface of the substrate, the third surface recessed relative to the first surface, the second cavity spaced apart from the first cavity;

depositing the first material onto the third surface of the substrate concurrently with the depositing of the first material onto the second surface of the substrate; and depositing the second material onto the first material within the second cavity concurrently with the depositing of the second material onto the first material within the first cavity.

15. The method of claim 13, wherein the third material includes an index matching gel.

16. A method of manufacturing a waveguide, the method comprising:

etching a cavity into a first surface of a substrate, the cavity defined by first and second sidewalls and a second surface, the second surface recessed relative to the first surface, the substrate between a first optical component and a second optical component, the first optical component including an optical signal emitter, and the second optical component including an optical signal receiver;

depositing a first material onto the second surface of the substrate, the first material having a first index of refraction;

measuring a depth of the cavity to the first material during deposition of the first material;

modifying deposition of the first material based on the measured depth of the cavity to the first material relative to a position of the optical signal emitter and the optical signal receiver to facilitate alignment of a second material with the optical signal emitter and the optical signal receiver;

depositing the second material onto the first material, the second material having a second index of refraction that is higher than the first index of refraction; and depositing a third material within the cavity, the first and second materials to be enclosed by the substrate and the third material, the third material having an index of refraction that matches the first index of refraction.

17. A method of manufacturing a waveguide, the method comprising:

etching a cavity into a first surface of a substrate, the cavity defined by first and second sidewalls and a second surface, the second surface recessed relative to the first surface;

depositing a first material onto the second surface of the substrate, the first material having a first index of refraction;

depositing a second material onto the first material, the second material having a second index of refraction that is higher than the first index of refraction, the first and second materials to completely cover the second surface across a distance between the first and second sidewalls;

etching the second material to create a first gap between the first sidewall and the second material and to create a second gap between the second sidewall and the second material; and depositing a third material within the cavity, the third material to fill the first and second gaps, the first and second materials to be enclosed by the substrate and the third material, the third material having an index of refraction that matches the first index of refraction.

18. The method of claim 17, including, prior to the depositing of the third material, etching the first material to extend the first gap toward the second surface between the first sidewall and the first material and to extend the second gap toward the second surface between the second sidewall and the first material.

19. A method of manufacturing a waveguide, the method comprising:

etching a cavity into a first surface of a substrate, the cavity defined by first and second sidewalls and a second surface, the second surface recessed relative to the first surface;

depositing a first material onto the second surface of the substrate, the first material having a first index of refraction;

depositing a release layer onto the first surface of the substrate, the release layer to overhang portions of the cavity adjacent the first sidewall and the second sidewall;

depositing a second material onto the first material, the second material having a second index of refraction that is higher than the first index of refraction, the overhang of the release layer to block the second material from being deposited directly adjacent the first and second sidewalls to create a first gap between the first sidewall and the second material and to create a second gap between the second sidewall and the second material; and depositing a third material within the cavity, the first and second materials to be enclosed by the substrate and the third material, the third material having an index of refraction that matches the first index of refraction, the third material to fill the first and second gaps.

20. A method of manufacturing a waveguide, the method comprising:

etching a cavity into a first surface of a substrate, the cavity defined by first and second sidewalls and a second surface, the second surface recessed relative to the first surface;

depositing a first material onto the second surface of the substrate, the first material having a first index of refraction;

depositing multiple layers of buffer material onto the second surface, the multiple layers of buffer material including the first material;

depositing a second material onto the multiple layers of buffer material, the second material having a second index of refraction that is higher than the first index of refraction, each of the multiple layers of buffer material having a different index of refraction to define a graded refraction interface adjacent the second material; and depositing a third material within the cavity, the first and second materials to be enclosed by the substrate and the third material, the third material having an index of refraction that matches the first index of refraction.

21. An apparatus comprising:

a substrate including a trench in a first surface of the substrate, the trench defined by a first sidewall, a second sidewall facing the first sidewall, and a trench bottom that extends between the first and second sidewalls, a depth of the trench corresponding to a first distance from the first surface to the trench bottom;

a first waveguide within the trench, a second distance between the trench bottom and the first waveguide being less than the first distance;

a second waveguide within the trench, the second waveguide spaced apart from the first waveguide; and a filler material to fill a space between the first and second waveguides, the filler material to extend a full distance from the first waveguide to the second waveguide.

22. The apparatus of claim 21, wherein the first waveguide has a first index of refraction, the apparatus including a layer of material having a second index of refraction which is lower than the first index of refraction, the layer of material between the trench bottom and the first waveguide.

23. The apparatus of claim 22, wherein the layer of material is a first layer of material, the trench is a first trench, and the trench bottom is a first trench bottom, the apparatus including:
- a third waveguide within a second trench of the substrate, the second trench including a second trench bottom; and
- a second layer of material between the third waveguide and the second trench bottom.

24. The apparatus of claim 22, including a filler material having a third index of refraction that matches the second index of refraction, the filler material to surround portions of the first waveguide not in contact with the layer of material.

25. The apparatus of claim 21, including:
- a first optical component; and
- a second optical component, the first optical component including an optical output, and second optical component including an optical input, the first waveguide aligned with the optical output and the optical input to transmit an optical signal therebetween.

* * * * *